G. R. CRANE.

Check-Valves.

No. 5,975. Reissued July 21, 1874.

WITNESSES.

W. T. Newman,

Robt. M. Barr.

INVENTOR

George R. Crane.

By Lagner & Lagner.

Attorneys.

THE GRAPHIC CO. PHOTO-LITH. 39 & 41 PARK PLACE, N.Y.

UNITED STATES PATENT OFFICE.

GEORGE R. CRANE, OF PAINESVILLE, OHIO, ASSIGNOR OF ONE-HALF INTEREST TO HORACE STEELE AND R. K. PAIGE.

IMPROVEMENT IN CHECK-VALVES.

Specification forming part of Letters Patent No. 145,789, dated December 23, 1873; reissue No. 5,975, dated July 21, 1874; application filed May 21, 1874.

*To all whom it may concern:*

Be it known that I, GEORGE R. CRANE, of Painesville, in the county of Lake and State of Ohio, have invented certain new and useful Improvements in Check-Valves; and I do hereby declare the following to be a full, clear, and exact description of the invention, such as will enable others skilled in the art to which it pertains to make and use it, reference being had to the accompanying drawings, which form part of this specification, in which—

Figure 1:
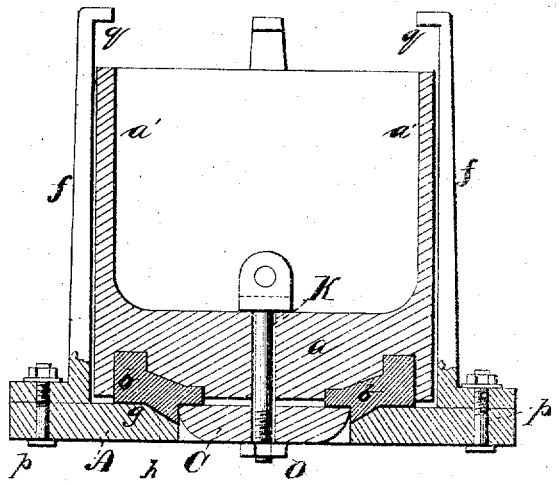
Figure 2:
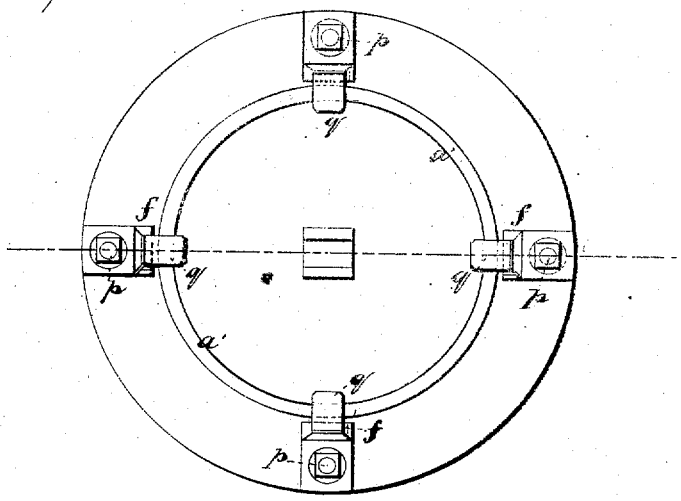

Figure 1 is a sectional elevation of my improved valve, taken on the line *x x* of Fig. 2; and Fig. 2 is a plan view of my valve.

My invention consists in the various parts and combinations, as hereinafter specified and claimed, wherein *a* represents the disk of the valve, and *a'* the cylindrical extension above it. This extension is preferably made hollow for economizing weight and material. It is arranged in a cage, *f f*, composed of three or more standards, bolted onto the bottom A of the tank or reservoir by bolts P, and having a lug, *q*, at the top to prevent the valve from being lifted out of its place. The part *a'* of the valve and standards is extended sufficiently high to prevent the valve from tilting laterally and remaining open at one side in case a small piece of gravel or other substance should lodge on the seat under it, but so as not to cramp or bind it in such a manner as would interfere with its easy action. *b* represents a ring or gasket of leather, rubber, or other suitable soft and elastic material, with which the valve is bushed or seated in the part that rests on the valve-seat *g h*. The ring or gasket *b* is preferably fitted into an annular recess in the face of the valve, and is secured by clamping-disk C, bolt K, and nut O. The upper margin of the disk bears in an annular rabbet in the under side of the bushing and holds it in place. By using this disk for holding the bushing *b*, I am enabled to utilize the bolt K, to which the lifting-rod is attached for fastening the said bushing.

I make the valve-seat in the bottom plate A in two parts, one of which, *g*, is in a flat plane, and the other, *h*, is conical or concave, as may be preferred.

With the flexible bushing of the valves, constructed to correspond with the form of the valve-opening in the plate A, as set forth, I accomplish a valve which is tight at all times, although foreign substances, such as gravel, &c., may lodge within it.

It is obvious that foreign substances must rest either upon the plane *g*, or the incline *h*, and not upon the angle of the two. The elasticity of the gasket or ring *b* will prevent the usual wear and destruction of the valve by gravel, &c., as said gravel will be embedded within it. It is also obvious that either the portion *g* or *h* will be in close contact at all times with the opposing gasket *b*, and whatever wear or destruction is sustained by the said gasket *b* will be accommodated by its elastic character and its peculiar formation. It is also obvious that substantially all wear and destruction will be suffered by ring or gasket *b*, and that as often as necessary said ring or gasket may be removed and duplicated at a trifling trouble and expense.

I claim as my invention—

1. The bars composing the cage, having a stud to keep the valve in place, and being detachably connected to the plate A, to allow of removing the valve by removing one of said bars, substantially as set forth.

2. The elastic ring or gasket *b*, provided with the plane or horizontal face *g* and beveled or concave face *h*, substantially as shown.

3. In combination with the elastic ring or gasket *b*, provided with the plane and beveled faces *g h*, a correspondingly-formed opening in the floor A of the tank or reservoir, substantially as shown.

In testimony that I claim the foregoing I hereunto set my hand this 1st day of May, 1874.

GEORGE R. CRANE.

Witnesses:

C. S. BARTLETT,

S. L. THOMPSON.